(12) United States Patent
Hart et al.

(10) Patent No.: US 8,966,396 B2
(45) Date of Patent: Feb. 24, 2015

(54) INFORMATION MANAGEMENT WITH NON-HIERARCHICAL VIEWS

(75) Inventors: David Hart, San Francisco, CA (US); Laurent Baumann, Campbell, CA (US); Patrick Coffman, San Francisco, CA (US); Aram David Kudurshian, San Francisco, CA (US); Kevin Tiene, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/349,474

(22) Filed: Jan. 12, 2012

(65) Prior Publication Data

US 2012/0185800 A1 Jul. 19, 2012

Related U.S. Application Data

(60) Provisional application No. 61/433,195, filed on Jan. 14, 2011.

(51) Int. Cl.
*G06F 3/048* (2013.01)
*G06F 17/30* (2006.01)
*G06F 3/0481* (2013.01)

(52) U.S. Cl.
CPC ...... *G06F 17/30126* (2013.01); *G06F 3/04817* (2013.01); *G06F 17/30112* (2013.01)
USPC ........... 715/810; 715/781; 715/784; 715/837; 715/800

(58) Field of Classification Search
CPC .......... G06F 17/30126; G06F 3/04817; G06F 3/0482
USPC .......................... 715/810, 781, 784, 837, 800
See application file for complete search history.

(56) References Cited

U.S. PATENT DOCUMENTS

| 5,657,433 A | 8/1997 | Murase et al. |
| 6,487,959 B2 | 12/2002 | Perez et al. |
| 6,562,076 B2 | 5/2003 | Edwards et al. |
| 7,437,358 B2 | 10/2008 | Arrouye et al. |

(Continued)

OTHER PUBLICATIONS

Steve Schwartz, Visual Safari Books Online, Organizing and Editing Your Photos with Picasa, May 10, 2005, Peachpit Press, Chapter 3. Viewing Photos, Use Timeline View, pp. 1-2, http://techbus.safaribooksonline.com/book/photo-and-graphic-manipulation/0321369017/viewing- photos/ch03lev1sec2#X2ludGVybmFsX0h0bWxWaWV3P3htbGlkPTAzMjEzNjkwMTclMkZjaDAzb GV2M.*

(Continued)

*Primary Examiner* — Kieu Vu
*Assistant Examiner* — Joy M Weber
(74) *Attorney, Agent, or Firm* — Blakely, Sokoloff, Taylor & Zafman LLP

(57) ABSTRACT

Information items in a file system are arranged into groups that are created according to a grouping component. A non-hierarchical view displays visual representations (e.g., icons, thumbnail images) of the information items arranged in visually delineated groups according to an arrange type that can be specified for each group. Various view formats are available including icon, list and column view formats. In each view format, a condensed mode can be selected for one or more groups, resulting in multiple visual representations of items being displayed in a fixed amount of screen space in the non-hierarchical view. In icon view, each condensed group includes a single row of visual representations that can be navigated separately from other groups in the non-hierarchical view.

27 Claims, 13 Drawing Sheets

(56) References Cited

U.S. PATENT DOCUMENTS

| | | | |
|---|---|---|---|
| 7,730,012 | B2 | 6/2010 | Arrouye et al. |
| 7,797,643 | B1 | 9/2010 | Jobs et al. |
| 2003/0110188 | A1 | 6/2003 | Howard et al. |
| 2003/0158767 | A1 | 8/2003 | Nwafor et al. |
| 2005/0132070 | A1 | 6/2005 | Redlich et al. |
| 2006/0036568 | A1* | 2/2006 | Moore et al. ............... 707/1 |
| 2006/0123038 | A1 | 6/2006 | Fenton et al. |
| 2006/0195724 | A1 | 8/2006 | Filho |
| 2007/0064612 | A1 | 3/2007 | Armanino et al. |
| 2007/0233647 | A1 | 10/2007 | Rawat et al. |
| 2008/0046840 | A1 | 2/2008 | Melton et al. |
| 2008/0307343 | A1 | 12/2008 | Robert et al. |
| 2009/0106674 | A1* | 4/2009 | Bray et al. ............... 715/762 |
| 2011/0231428 | A1 | 9/2011 | Kuramura |

OTHER PUBLICATIONS

David Pogue: "Mac OS X: The Missing Manual, Tiger Edition", May 31, 2006, pp. 87-109, XP55022913, Sebastopol, Retrieved from the Internet: URL:http://books.google.de/books?id=5YgPR5DM1rsC&pg=PR2&dq=%22Mac+OS+X,+Tiger+edition:+the+missing+manual%22&hl=de&sa=&ei=72twT5ikFKrD0QXo86GNAg&ved=0CEYQ6AEwAA#v=onepage&q=%22Mac%200S%20X%2C%20Tiger%20edition%3A%20the%20missing%20manual%22&f=false; [retrieved on Mar. 26, 2012].

Anonymous: "Beagle—Quickly find the stuff you care about.", Feb. 17, 2007, pp. 1-2, XP55022856. Retrieved from the Internet: URL:http://web.archive.org/web/20070217232613/http://beagle-project.org/Main_Page; [retrieved on Mar. 26, 2012].

International Search Report and Written Opinion of the International Searching Authority, PCT Application Serial No. PCT/US2012/021325, Apr. 16, 2012, 14 pp.

*PCT International Preliminary Report on Patentability*, PCT/US2012/021325 filed Jan. 13, 2012, mailed Jul. 16, 2013, 9 pages.

*PCT Written Opinion of the International Searching Authority*, PCT/US2012/021325, filed Jan. 13, 2012, mailed Jul. 14, 2013, 8 pages.

*PCT Internatonal Search Report*, PCT/US2012/021325, filed Jan. 13, 2012, mailed Apr. 16, 2012, 3 pages.

"Beagle—Quickly find the stuff you care about", Feb. 17, 2007, 1 page.

Pogue, David, "Mac OS X: The Missing Manual, Tiger Edition", *Pogue Press/O'Reilly*, May 31, 2006, 18 total pages.

* cited by examiner

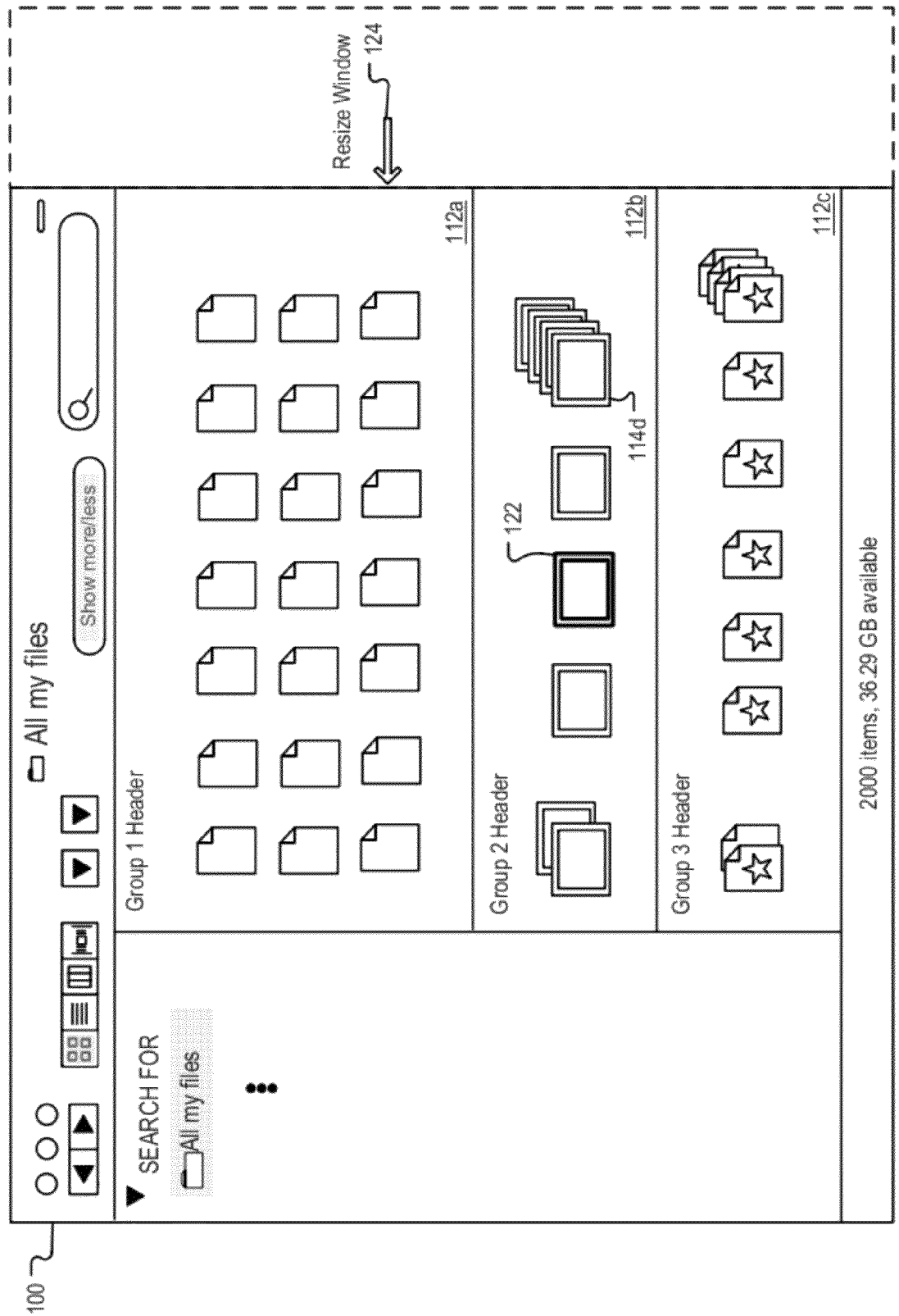

```
┌─────────────────────────────────────────────────────────────────┐
│ Displaying Non-Hierarchical View of Visual Representations of    │
│ User-Oriented Information Items In Groups Created According To   │
│ Grouping Component                                         702   │
└─────────────────────────────────────────────────────────────────┘
                              ↓
┌─────────────────────────────────────────────────────────────────┐
│ Receiving Input Initiating Navigation of Visual Representations  │
│ In Group In Non-Hierarchical View                          704   │
└─────────────────────────────────────────────────────────────────┘
                              ↓
┌─────────────────────────────────────────────────────────────────┐
│ Navigating Visual Representations In Group                       │
│ Independent of Other Groups In Non-Hierarchical View       706   │
└─────────────────────────────────────────────────────────────────┘
```

FIG. 7A

```
┌─────────────────────────────────────────────────────────────────┐
│ Displaying Non-Hierarchical View of Visual Representations of    │
│ User-Oriented Information Items In Groups Created According To   │
│ Grouping Component                                         710   │
└─────────────────────────────────────────────────────────────────┘
                              ↓
┌─────────────────────────────────────────────────────────────────┐
│ Receiving Input Initiating Display of Additional Visual          │
│ Representations In Group                                   712   │
└─────────────────────────────────────────────────────────────────┘
                              ↓
┌─────────────────────────────────────────────────────────────────┐
│ Displaying Additional Visual Representations in Group            │
│ Independent of Other Groups In Non-Hierarchical View       714   │
└─────────────────────────────────────────────────────────────────┘
```

FIG. 7B

INFORMATION MANAGEMENT WITH NON-HIERARCHICAL VIEWS

CROSS-REFERENCE TO RELATED APPLICATIONS

This application claims priority to U.S. Provisional Application No. 61/433,195, filed on Jan. 14, 2011, entitled "Information Management with Non-Hierarchical Views," the entire contents of which are incorporated herein by reference.

TECHNICAL FIELD

This disclosure relates generally to user interfaces for managing information on a computing device.

BACKGROUND

Modern computing devices often include a file system that stores information items in various directories or subdirectories (e.g., folders) in a file system hierarchy. Each information item (e.g., a file or a folder) can be given a respective filename. An information item's filename and its file path in the file system hierarchy can be used to identify uniquely the item in the file system. Each folder can include multiple files and subfolders. Modern computing devices also provide graphical user interfaces (GUIs) or "views" to help the user navigate and manipulate the file system hierarchy and the items stored therein.

SUMMARY

Information items in a file system are arranged in groups that are created according to a grouping component. A non-hierarchical view displays visual representations of the information items arranged in visually delineated groups that can be navigated by a user or application. The visual representations in each visually delineated group can be arranged according to a specified arrange type. Various view formats are available including icon, list and column view formats. In each view format, a condensed mode can be selected for one or more groups, resulting in multiple visual representations of items being displayed in a fixed amount of screen space in the non-hierarchical view. In icon view, each condensed group includes a single row of visual representations that can be navigated separately from other groups in the non-hierarchical view. The groups can also be navigated in the non-hierarchical view. In list and column view, each condensed group can be limited to a fixed number of rows for displaying visual representations of items with the group. The maximum number of rows allowed for representing a condensed group in list view can be adaptive, and can expand or contract as the window is resized.

The grouping component can be specified through an input mechanism (e.g., a pull down menu) or by an application. The grouping component determines the groups that are available in the non-hierarchical view. Depending on the grouping component selected, a non-hierarchical view can include groups based on file type, file size, date, association with an application program, labels or any other attribute. For example, a file type attribute results in the display of separate visually delineated groups displaying visual representations of text documents, audio files, web pages, digital images, videos, etc.

In some implementations, the non-hierarchical view can be resized. During the resizing, visual representations no longer in the non-hierarchical view due to the view contracting can be stacked on top of overflow icons located on either end of the row of visual representations. Similarly, visual representations that come into the non-hierarchical view due to the view expanding can be laid out in the row one by one. This resizing feature allows a currently selected icon to remain in the non-hierarchical view during and after the resizing.

In some implementations, file systems including user-oriented information items can be searched by a search engine using a query that includes and excludes file paths so that only user-oriented information items are return in a search result. Search filters can be used remove non user-oriented files. The queries can be initiated by group logic and updated as information items are added, deleted or modified in the file system so that the non-hierarchical view is current.

Particular implementations of information management using non-hierarchical views provide one or more of the following advantages. Non-hierarchical views displaying visually delineated groups of visual representations corresponding to user-oriented information items provide better visual feedback for user interaction with a computer file system. Such non-hierarchical views also allow more efficient or faster search, retrieval or evaluation of user-oriented information items.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIG. 1E is the non-hierarchical view of FIG. 1A illustrating the repositioning of visual representations in a group in response to resizing of the non-hierarchical view.

FIGS. 7A and 7B are flow diagrams of exemplary processes for navigating a group of visual representations in a non-hierarchical view.

Like reference symbols in the various drawings indicate like elements.

DETAILED DESCRIPTION

Exemplary Non-Hierarchical Views

Figure 1A:
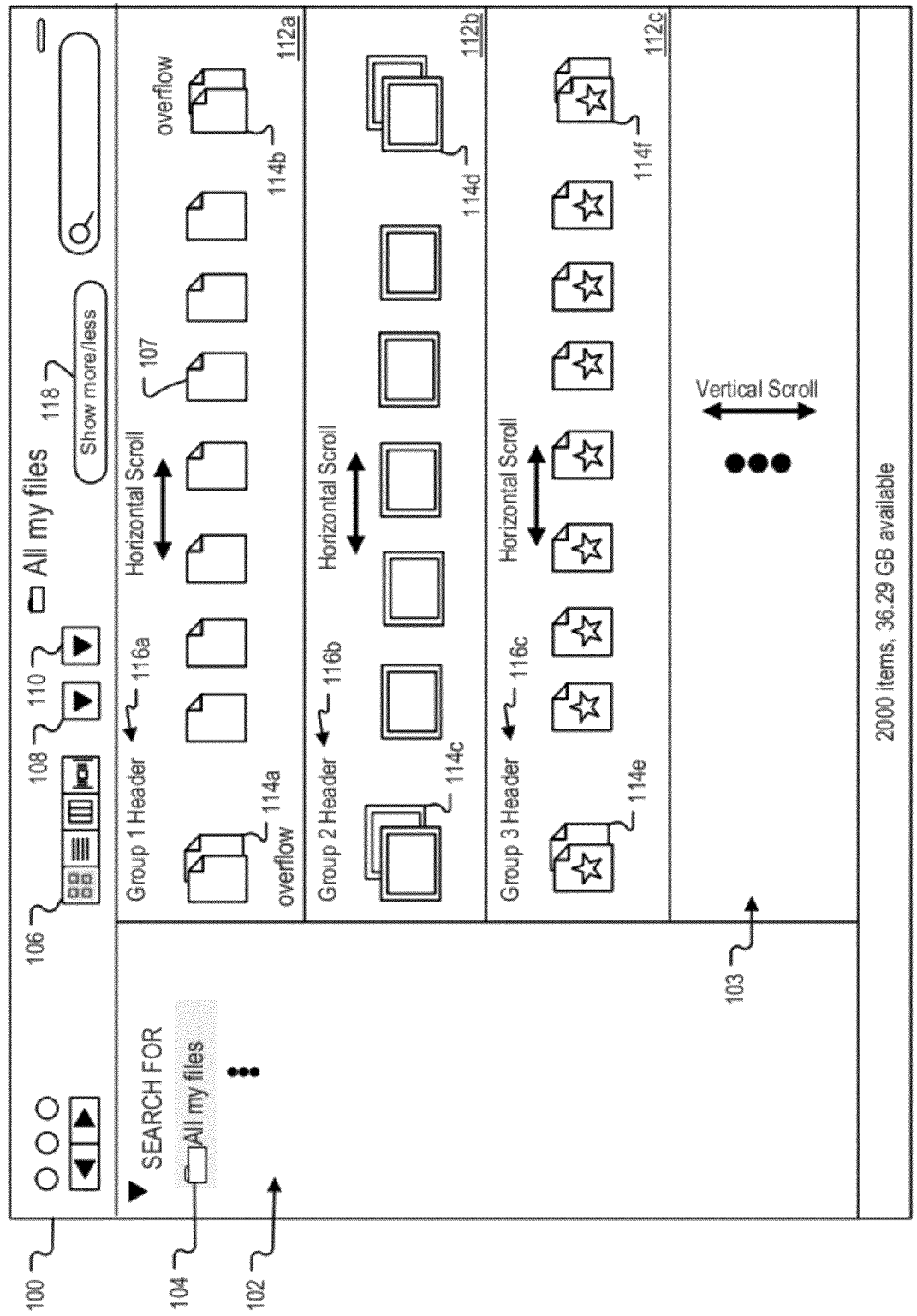
FIG. 1A illustrates an exemplary non-hierarchical, icon view of visual representations of user-oriented information items on a computer system display.

FIG. 1A illustrates an exemplary non-hierarchical, icon view of visual representations of user-oriented information items on a computer system display. In some implementations, user interface 100 can include sidebar 102, non-hierarchical view 103, view selector 106, attribute selector 108, arrange type selector 110 and condense view button 118.

User interface 100 can be displayed by any device capable of displaying information, including but not limited to: desktop or portable computer systems, mobile phones, electronic tablets, digital media devices, television systems, set-top boxes, digital cameras, video cameras, etc. User interface 100 can be navigated by a screen cursor manipulated by an input device (e.g., mouse, keyboard, trackball, track/touch pad). User interface 100 can also be presented on a touch sensitive display responsive to touch or gesture input made by one or more fingers, a stylus, light pen or other pointing device.

A used herein, the term "user-oriented" means any information item that is associated with a particular user, as opposed to an operating system file or application program file. An example of a "user-oriented" information item is a user generated document created on a text editor or digital photos or videos created by the user. As used herein, the term "information item" means any document, file or data that contain information, including but not limited to: text documents, digital photos or videos, files and web pages (HTML files). As used herein, the term "non-hierarchical view" means a file system view without levels of subdivision as opposed to traditional file system views that display files in subdivided levels or a tree view format of directories, folders and subfolders.

In some implementations, sidebar 102 includes container object 104. When container object 104 is selected, non-hierarchical view 103 is displayed in user interface 100. Non-hierarchical view 103 includes a number of visually delineated groups containing visual representations 107 (e.g., icons, thumbnail images) corresponding to user-oriented information items. Visual representations 107 are displayed in groups according to a specified grouping component.

In the example shown, an icon view format is selected on view selector 106 as indicated by the shading. In icon view, visual representations 107 are displayed in visually delineated groups 112 (e.g., delineated by lines, shadows, reflections, colors, etc.). Visual representations 107 in each group are displayed in a single row that can be navigated by a user. Groups 112 are identified by group headers 116. The display order of the groups can be changed manually by dragging a group header up or down non-hierarchical view 103.

Each group 112a-12c in non-hierarchical view 103 is created based on the grouping component, which determines the number of groups 112 to be displayed in non-hierarchical view 103. Some examples of grouping components include but are not limited to: Kind, Size, Date, Apps and Label. In the example shown, the Kind grouping component is currently selected using, for example, attribute selector 108. The Kind attribute causes one or more groups to be displayed for each type of information item. Types of information items can include but are not limited to: text documents, digital images, audio files, video files, documents in portable document format (.pdf), spreadsheets, presentations and web pages.

In FIG. 1A, group 112a includes visual representations 107 of text documents, group 112b includes visual representations 107 of digital images and group 112c includes visual representations 107 of video files. Although three groups 112a-112c are shown in view 103, view 103 can include any number of groups depending on the grouping component selected.

If view 103 is displayed on a touch sensitive display or if a touch pad or surface is available, additional groups can be navigated to by vertically scrolling view 103 using a swiping gesture, for example. If view 103 is not presented on a touch sensitive display and a touch pad or surface is not available, then a user interface element (e.g., a vertical scroll bar) can be used to display additional groups.

In addition to vertical scrolling, each group of visual representations 107 can be horizontally scrolled independent of other groups. For example, using a touch sensitive display or pad a user can make a swiping gesture within a group in the left or right direction to display additional icons in that group. If a touch sensitive display or pad is not available, overflow icons 114 displayed on opposite ends of the row can be selected by a screen cursor to display additional icons in the group in the row. The overflow icons can be displayed in a three-dimensional perspective with depth and slightly rotated, such as overflow icons 910a, 910b and 910c shown in FIG. 9.

Figure 1B:
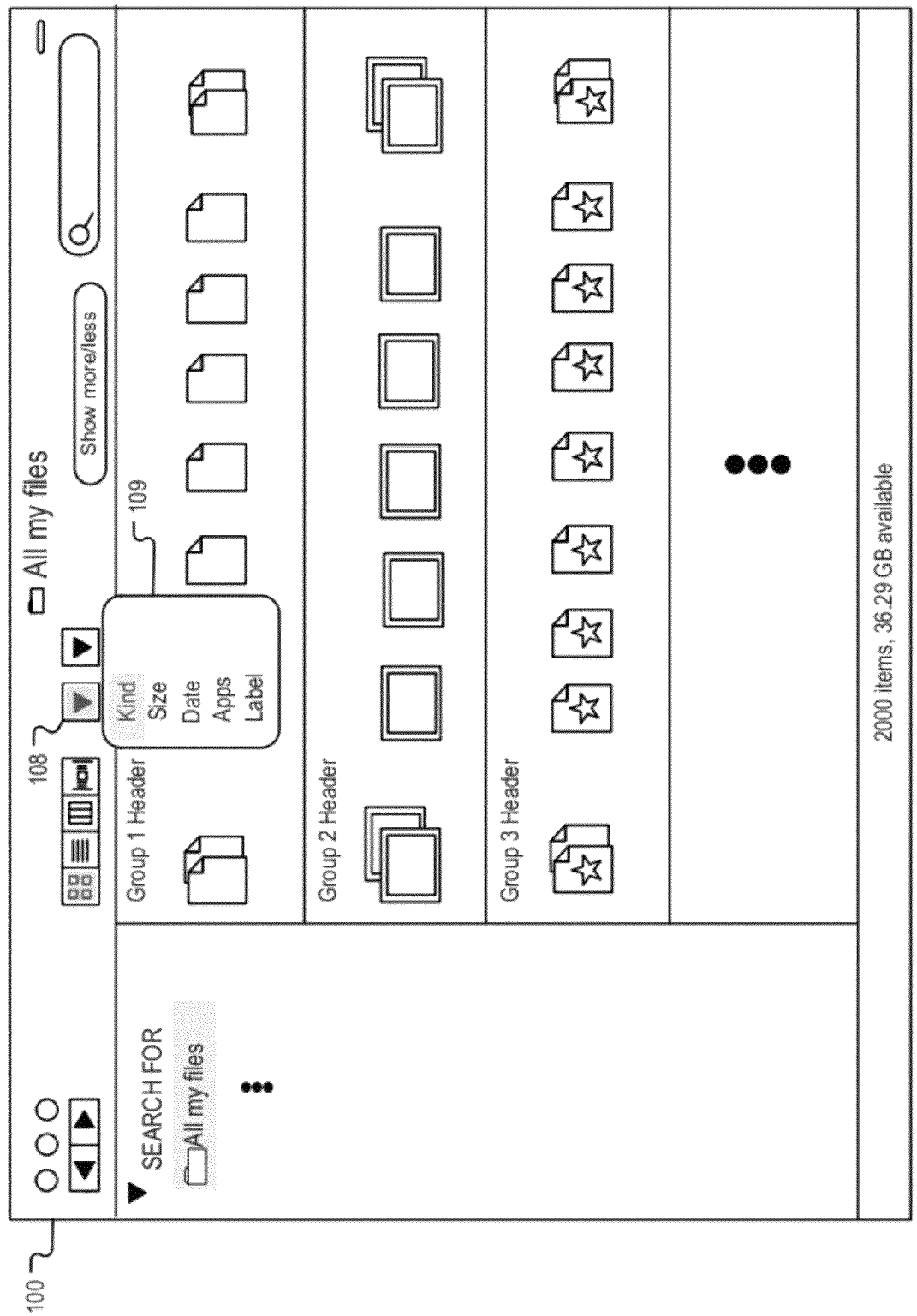
FIG. 1B is the non-hierarchical view of FIG. 1A illustrating the selection of a grouping component.

FIG. 1B is the non-hierarchical view of FIG. 1A illustrating the selection of grouping components. In some implementations, a grouping component can be selected using attribute selector 108 in user interface 100. Upon selection of attribute selector 108, a menu 109 of grouping component options is displayed which can be selected by a user. Some examples of grouping components can include but are not limited to: Kind, Size, Date, Apps and Label. As previously stated, the Kind attribute creates one or more groups based on types of information items.

Additionally, a user can select a Size grouping component which results in the display of groups based on file size. For example, groups can be created based on fixed cluster sizes (e.g., 0-100 MB cluster) or by a cluster size specified by a user or by analysis of the files.

A user can select the Data grouping component to create one or more groups based on time, such as groups for information items that were created, modified or last opened on the current day, the past week, the past month or any other desired time range.

A user can select the Apps (Applications) grouping component to create groups based on application programs that view or edit information items. For example, groups can be created for preview files that are associated with a preview application for viewing file contents, web pages that are associated with a web browser, text documents that are associated with a text editor or word processing application, and so on.

A user can select a Label grouping component to create groups based on labels or other metadata. Labels can be the names of files or some other file metadata specified by a user. In some implementations, selecting the Label attribute from attribute selector 108 causes a Label editor (not shown) to open in user interface 100. The Label editor allows a user to specify a label for a file. In some implementations, the editor displays color picker to allow the user to assign a color as a label. When the Label attribute is selected, non-hierarchical view 103 will display group headers 116 in the specified color. Visual representations 107 corresponding to labeled information items are displayed in groups according to color.

In some implementations, a user can drag and drop a visual representation from one group to another group and the information item corresponding to the visual representation will have its label updated to the color of the group where the visual representation is dropped. For example, when dragging a visual representation over a group view, the drag can be validated according to a predefined order. For example, if the drag is over a visual representation and the visual representation would accept the drop, the visual representation is highlighted and validation is complete. If the drag is over the background of a group, or over a visual representation that does not accept the drag, and if the group the visual representation is being dragged onto accepts the drop, the group is highlighted and validation is complete. If no visual representation or group would accept the drop, but the target of the view would accept the drop, the entire view is highlighted.

When dragging a visual representation from one group to another, the group can indicate that it would accept a drop of the visual representation if the group corresponds directly to a writable attribute. For example, if a container is visited in group view in "group by label" mode, each group can represent a label value and because label values are writable, dragging a visual representation from the "blue" label group, the "red" label group can be interpreted to mean that the dropped visual representation should get its label set to red. For other grouping modes, although the group may correspond to a grouping component, it may not make sense for it to be writable (e.g., when grouping by size). Each group manager (See FIG. 4) can implement the validation of drops for its corresponding group.

Figure 1C:
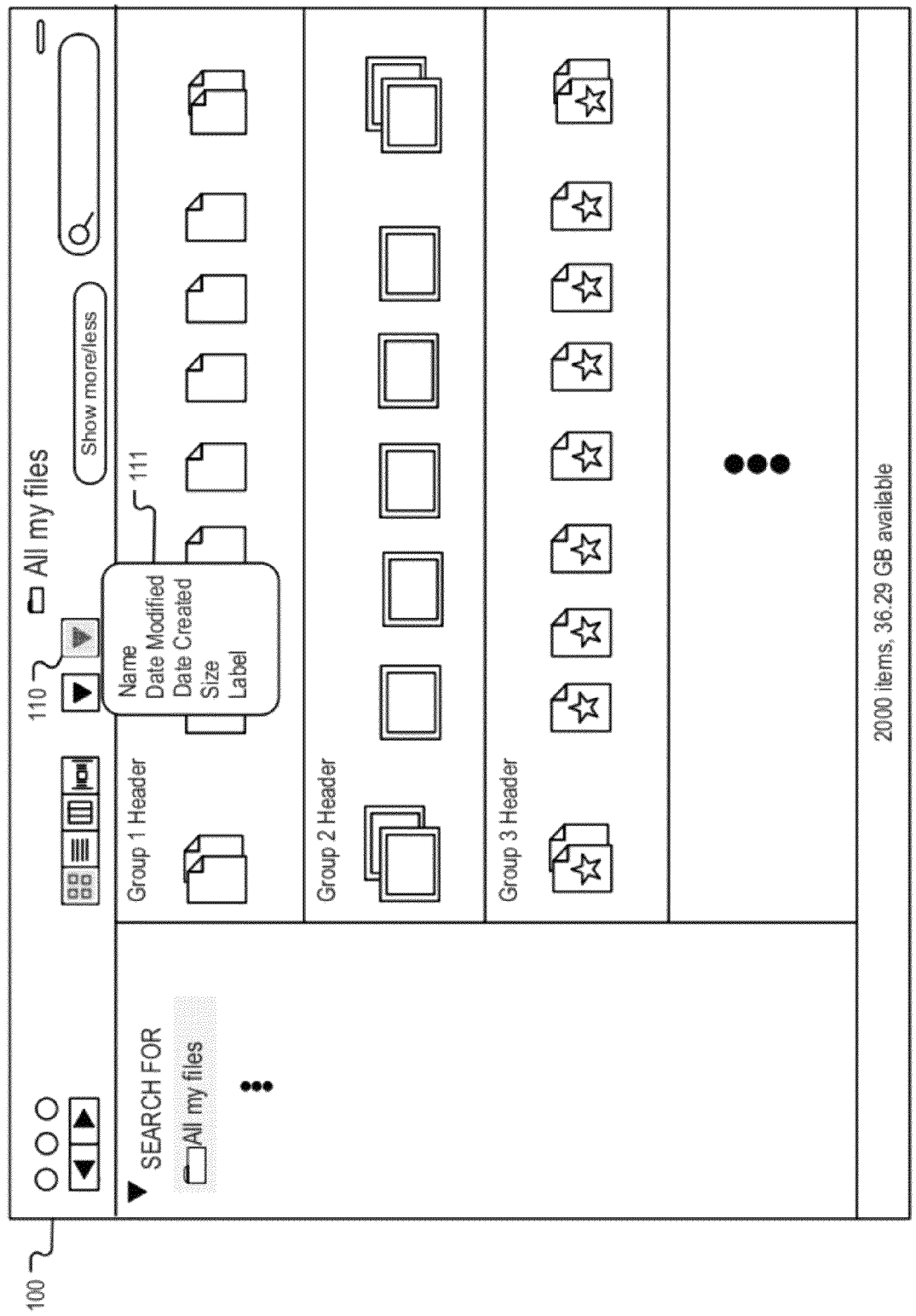
FIG. 1C is the non-hierarchical view of FIG. 1A illustrating the selection of an arrange type.

FIG. 1C is the non-hierarchical view of FIG. 1A illustrating the selection of an arrange type. In addition to organizing visual representations by grouping components, visual representations can also be arranged in a group by sort order or arrange type. In some implementations, an arrange type selector 110 can be used to specify arrange type in a pull down menu 111. Some examples of arrange types can include but are not limited to: alphanumeric (e.g., file name, label, kind, version, comment), date (e.g., date created, data modified, date last opened) and numeric (e.g., size, dimensions, resolution). The subsort options available through selector 110 can be changed based on the grouping component selected. Thus, the visual representations 107 in each group can be arranged independent of the arrangement specified for other groups in view 103. In some implementations, the user is provided with a discoverable mechanism (e.g., a pop-up menu) for setting the groupings, and to provide the user with appropriate default arrangements for each grouping mode. An additional mechanism (e.g., a second pop-up menu) can be made available to users to set the groups arrangement of visual representations as needed.

Figure 1D:
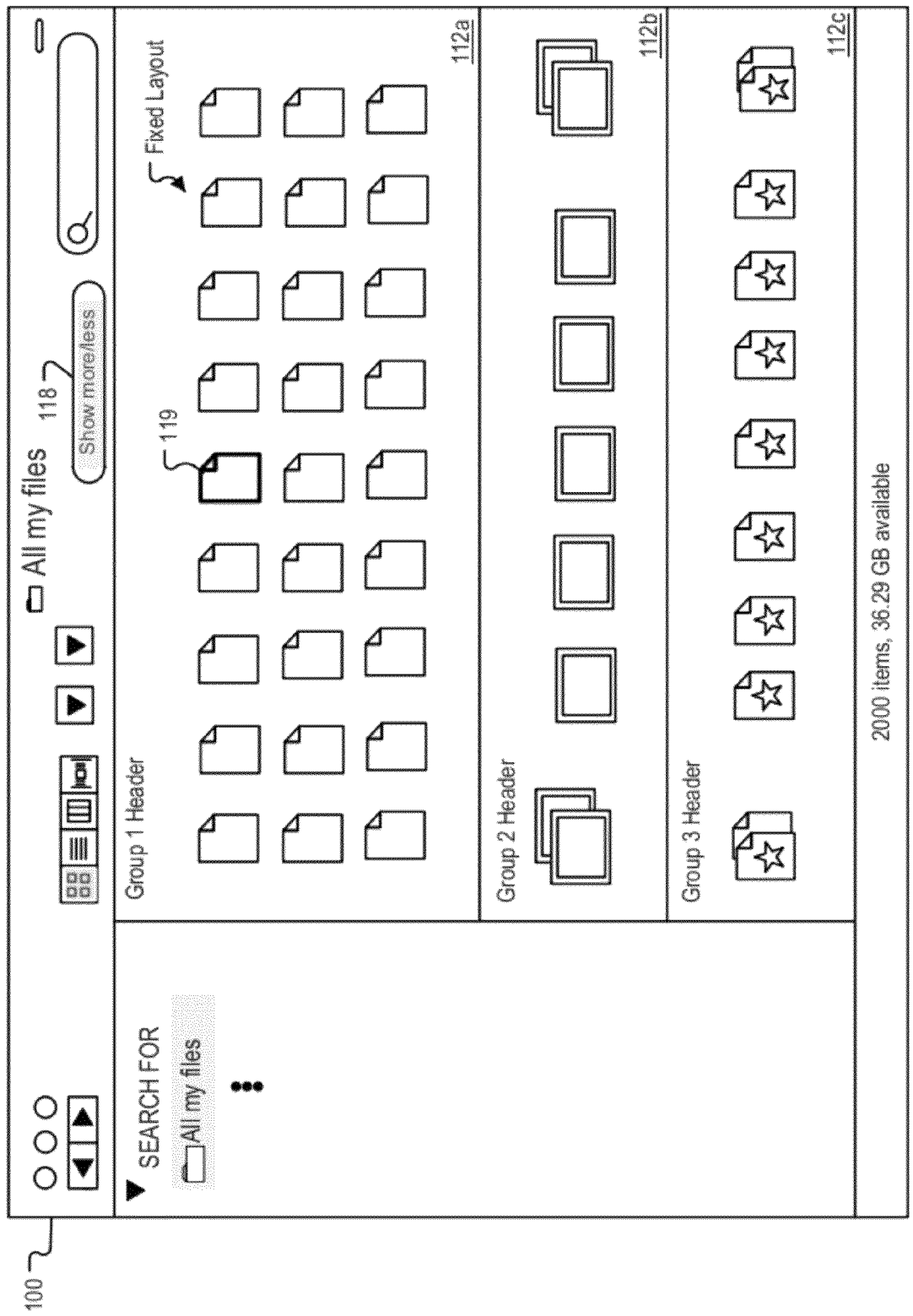
FIG. 1D is the non-hierarchical view of FIG. 1A illustrating expanded and condensed views of groups.

FIG. 1D is the non-hierarchical view of FIG. 1A illustrating a condensed view of a group. In some implementations, a user can specify a condense view option in user interface 100. The condense view option can be selected using, for example, condense view button 118. Upon selection of the condense view button 118, the group 112 that is currently in focus (e.g., the user has selected a visual representation in the group) will be displayed in a fixed amount of screen space in non-hierarchical view 103. In the example shown, visual representation 119 is selected making group 112a the active group. When condense view button 118 is selected, visual representations 107 in group 112a are displayed in multiple rows (e.g., a grid view) in a fixed amount of screen space in non-hierarchical view 103. Selecting condense view button 118 again will result in the visual representations in group 112a reverting back to a single row display format. Each group 112 can be independently condensed without affecting the display format of the other groups in view 103.

Although FIG. 1D shows an icon view, condensed mode can be used for any display format. Selecting condense view button 18 in any view (e.g., icon, list, column) will limit the amount of screen space used to represent the group regardless of the number of items within the group. This allows multiple groups to be displayed in a limited amount of screen resolution without scrolling through all visual representations in each group.

In icon view, when a group is condensed it will show a single row of visual representations of items that stack at the edge if there is not enough screen space to display all the visual representations at once. In the condensed mode, the single row of icons can be navigated by scrolling. When the condensed icon group is expanded, the visual representations are laid out in a two-dimensional grid from left edge to right edge, row by row, as shown in FIG. 1D. The expanded state can push following groups (e.g., groups 2 and 3 in FIG. 1D) off screen, thus requiring the use of scrolling to view the other groups.

For list and column views (FIGS. 2 and 3), condensed mode can limit the number of rows per group to a reasonable number to allow multiple groups to be visible in a typical window. For example, a typical window may be large enough to represent 50 total rows in a list view. When showing a list or column view in condensed mode, each condensed group may be limited to showing a maximum of 10 rows at a time. If there were 5 groups, all the groups would be visible and the user would see some of the visual representations of items from each group, and can expand the group to see all of the visual representations of items within the group.

In some implementations, list and column views can exhibit an additional behavior. Because computers are used with displays with varying sizes and resolutions, there may be many different sizes of windows in use. The condensed mode for list and column views can limit each group to a constant maximum number of rows. However, if additional space is available after limiting each group to a constant number of rows, then it may be wasteful to leave the additional space empty. As such, condensed mode layout logic for list and column view adapts, expanding the maximum number of rows per group until all visual representations of items in the group are visible, or until all available space in the window is used without resorting to scrolling. In this way, a user can expand the window, and previously hidden rows will be added to each group to take advantage of the newly available space. Likewise, if the window is contracted and all groups are in a condensed state, the number of rows allowable per group can be reduced as the window contracts until a minimum number of rows per group are reached.

FIG. 1E is the non-hierarchical view of FIG. 1A illustrating repositioning of visual representations in a group in response to resizing of the non-hierarchical view. In some implementations, visual representations will be repositioned in a group to maintain a selected visual representation in view when view 103 is resized by a user or application.

In the example shown, a screen cursor 124 is used to resize non-hierarchical view 103 from the right side, causing view 103 to contract in size. Visual representation 122 in group 112b is currently selected. To maintain visual representation 122 in non-hierarchical view 103 during and after resizing, a visual representation that falls outside the view 103 due to its contraction is animated to stack onto overflow icon 114d. The stacking can occur during the resizing. By stacking visual representations onto overflow icon 114d, selected visual representation 122 remains in view 103. This same stacking animation also occurs in other groups that are not in condensed view, such as group 112c. Similarly, if view 103 expands due to resizing, the visual representation at the top of the stack is animated to be laid out in the group row, similar to dulling out a stack of playing cards.

Figure 2:
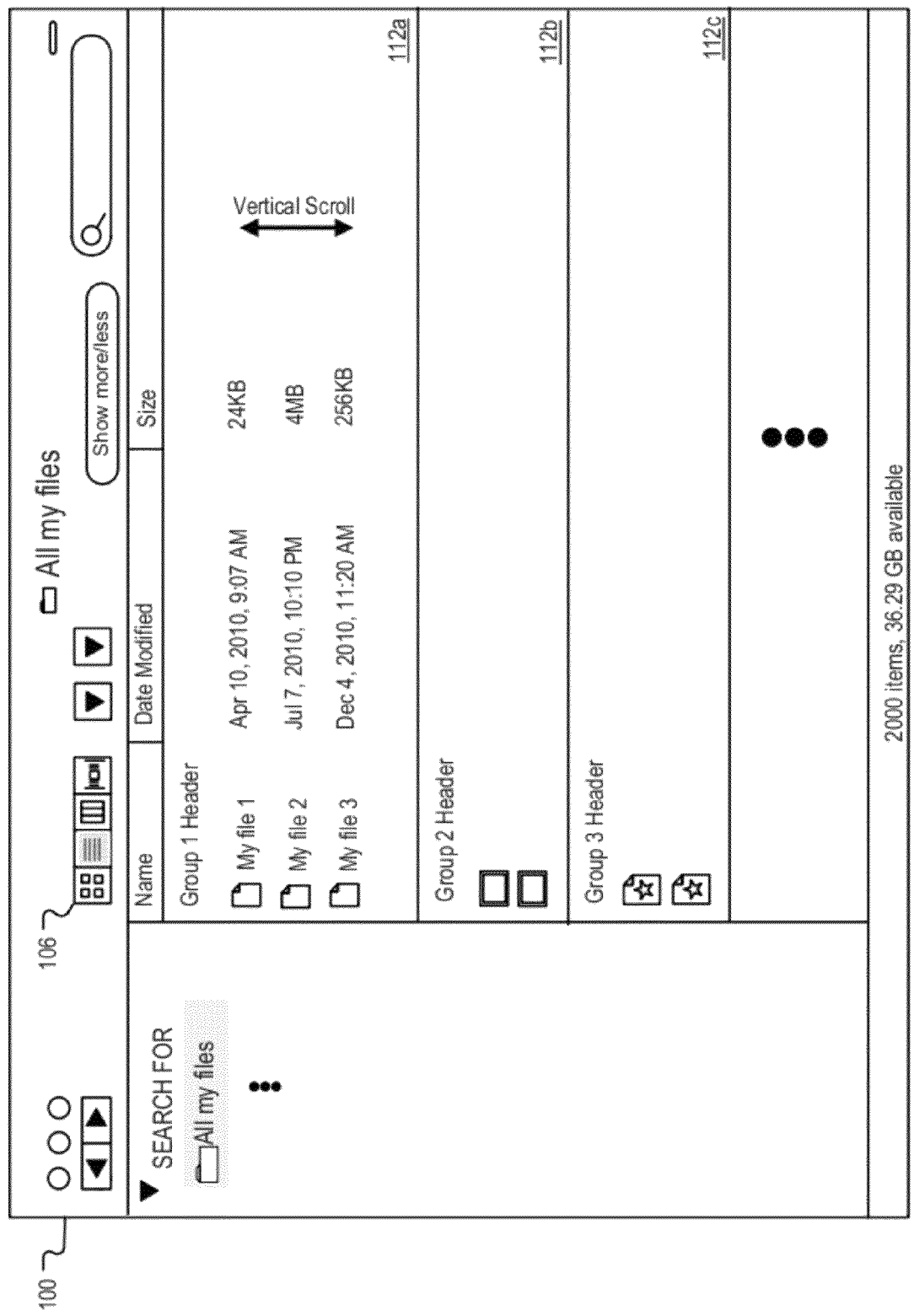
FIG. 2 illustrates an exemplary non-hierarchical, list view of visual representations of user-oriented information items on a computer system display.

FIG. 2 illustrates an exemplary non-hierarchical, list view of visual representations of user-oriented information items on a computer system display. In some implementations, a list view can be selected using view selector 106. In list view, visual representations in each group are laid out in their own rows, creating a list of visual representations for each group. Each group list can be vertically scrolled to display additional visual representations in the list. Other information can also be displayed with the visual representations, such as a date modified field and size field. In list view, each group can be condensed such that the group is limited to a fixed number of rows for displaying visual representations of items. The maximum number of rows allowed for representing a condensed group in list view can be adaptive, and can expand or contract as the window is resized.

Figure 3:
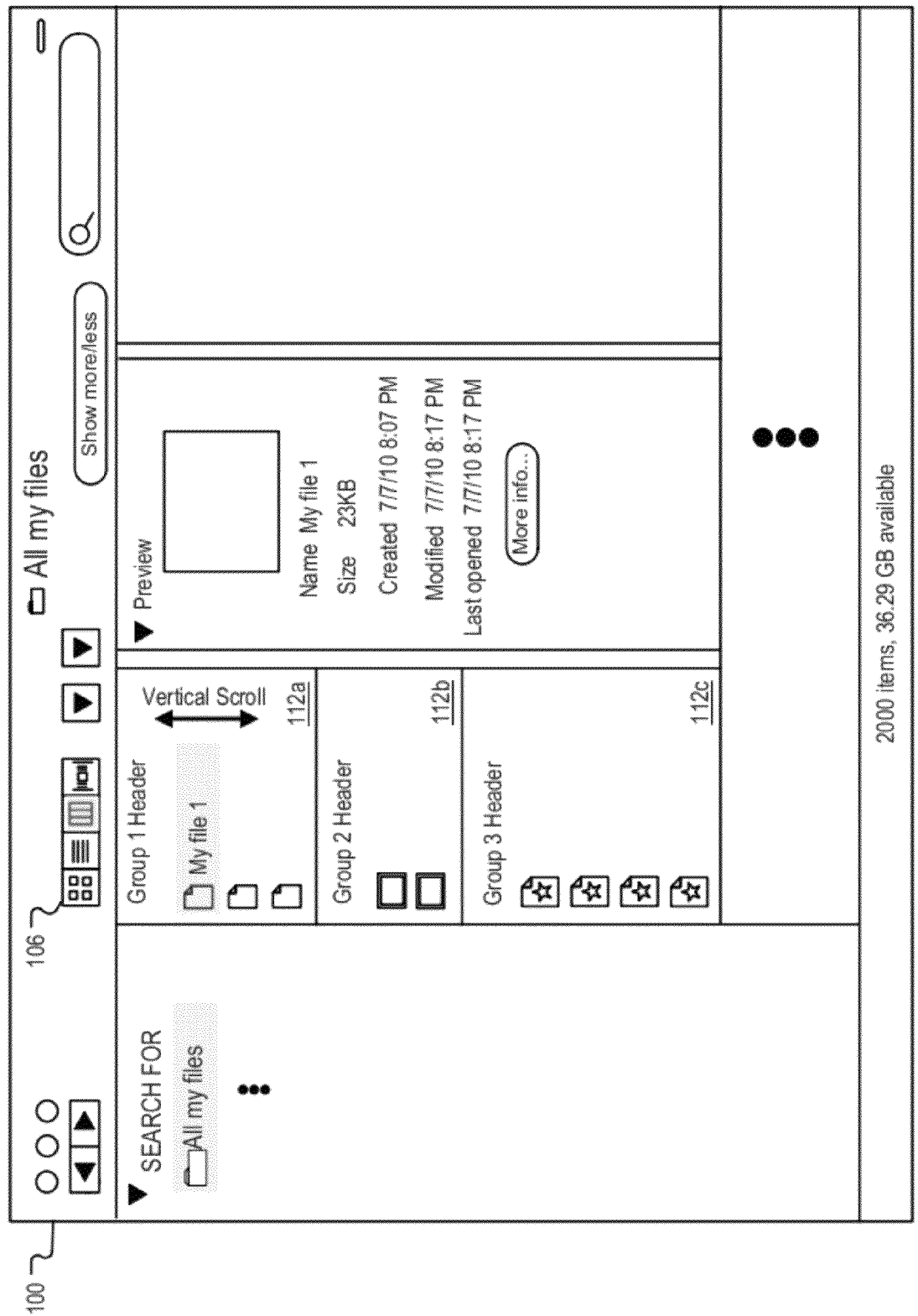
FIG. 3 illustrates an exemplary non-hierarchical, column view of visual representations of user-oriented information items on a computer system display.

FIG. 3 illustrates an exemplary non-hierarchical, column view of visual representations of user-oriented information items on a computer system display. In some implementations, a column view can be selected using view selector 106. In column view, visual representations in each group can be laid out in a first column. A second column can display a preview and other information about a selected information item. In the example shown, My File 1 is selected from group 112a, causing a preview and basic information for My File 1 to be displayed in the adjacent column in view 103. Each group 112 in the first column can be vertically scrolled to display additional visual representations. In column view, each group can be condensed such that the group is limited to a fixed number of rows for displaying visual representations of items.

Exemplary Software Architecture

Figure 4:
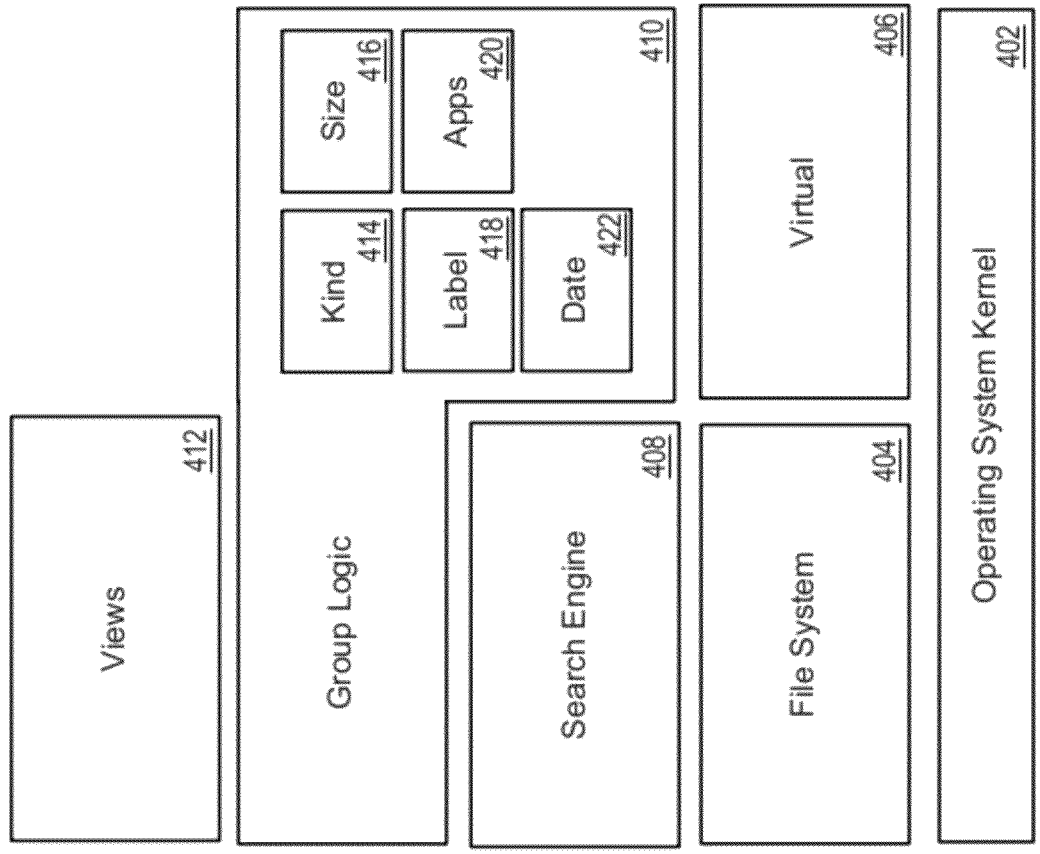
FIG. 4 illustrates exemplary software architecture for implementing a non-hierarchical view of visual representations of user-oriented information items.

FIG. 4 illustrates exemplary software architecture 400 for implementing a non-hierarchical view of visual representations of user-oriented information items. In some implementations, software architecture 400 can include views layer 412, group logic layer 410, search engine 408, file system 404, virtual file system 406 (e.g., files accessible through a network) and operating system kernel 402. Group logic layer 410 can include a number of group managers, including a group manager for each of grouping component: Kind 414, Size 416, Label 418, Apps 420 and Date 422.

In some implementations, when a computer system hosting file systems 404, 406 is first turned on or otherwise activated, group logic 410 automatically issues a query to search engine 408 to start a search for user-oriented files stored in file systems 404, 406. In this manner, the user can get near instant results when non-hierarchical view 103 is invoked for the first time. An example search engine 408 is described in U.S. Pat. No. 6,487,959 assigned to Apple Inc. of Cupertino, Calif.

The query can include file paths to be included and excluded in the search. A set of search filters can be used by search engine 408 to exclude certain information items from the search results. For example, information items that are not user-oriented can be filtered out of the search results. The query can be a "live" query in which search results responsive to the query are continuously updated by search engine 408 as information items in the search results are added, deleted, modified or accessed by file systems 404, 406.

The search results (list of user-oriented information items) are returned to group logic 410 where the user-oriented files are processed by group managers 414, 416, 418, 420, 422, depending on which grouping component is selected through attribute selector 108. The group managers organize the search results into arranged groups. These arranged groups provide the item information to Views layer 412. Views layer 412 can include various graphical user interface methods for displaying non-hierarchical views, as described in reference to FIGS. 1-3. Views layer 412 can also handle the various features associated with views, including processing user inputs.

Exemplary Processes

Figure 5:
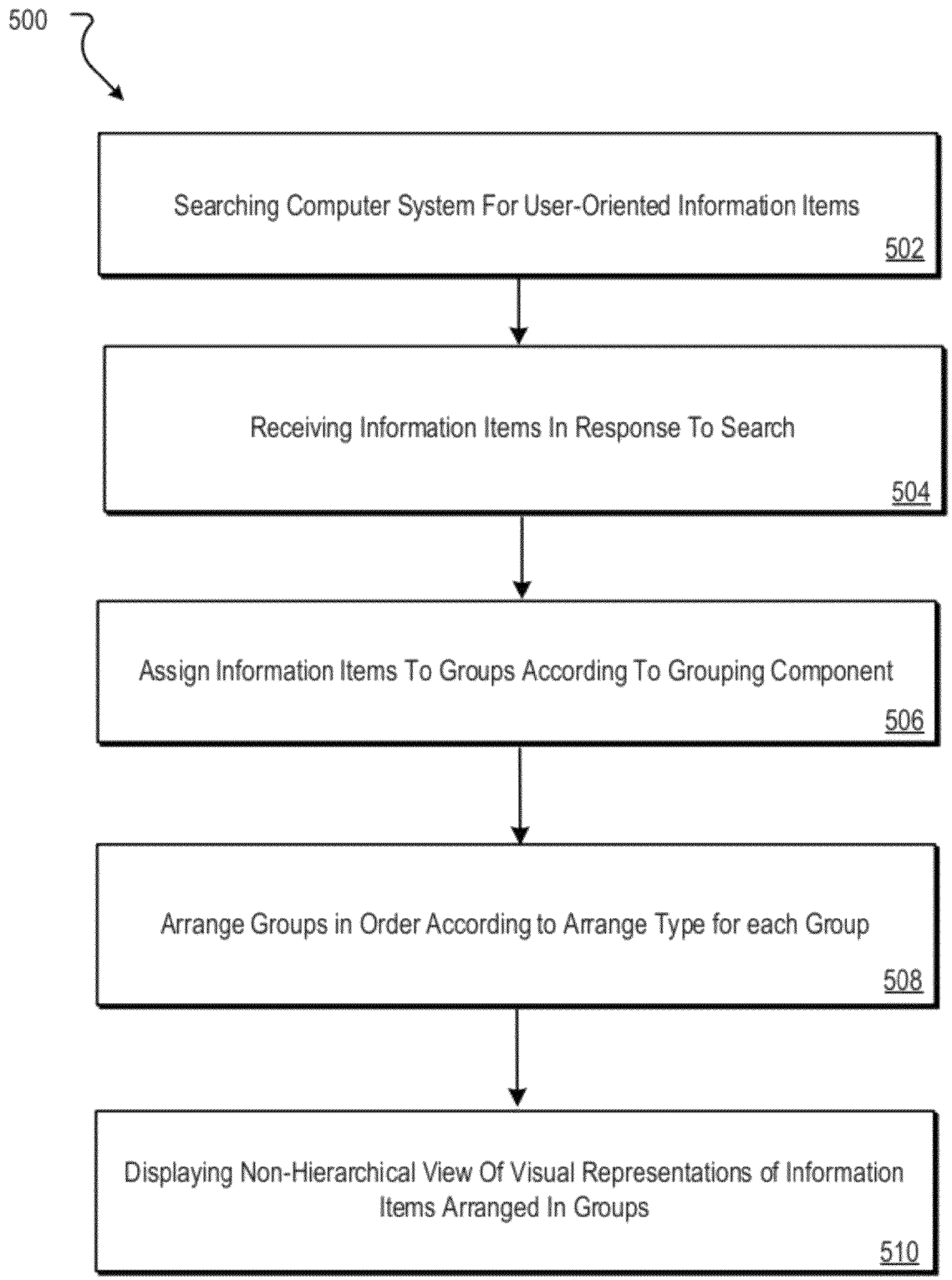
FIG. 5 is a flow diagram of an exemplary process for creating a non-hierarchical view of visual representations of user-oriented information items.

FIG. 5 is a flow diagram of an exemplary process 500 for creating a non-hierarchical view of visual representations of user-oriented information items. Process 500 can be implemented by software architecture 400 implemented on device architecture 800, as described in reference to FIGS. 4 and 8.

In some implementations, process 500 can begin by searching one or more file systems of computing device for user-oriented information items (502). For example, group logic can issue a query to a search engine to search for all user-oriented files in the file systems available to the computing device. The query can include and exclude certain file paths. Search filters can be applied to the search results to exclude non user-oriented files. For example, operating system or application files may be excluded.

Process 500 receives user-oriented information items in response to the query (504). The information items found by the search engine are passed back to the group logic which assigns the information items to one or more groups (506) based on a selected grouping component, as described in reference to FIG. 4. Process 500 then arranges groups in order according to arrange type for each group (508).

Next, process 500 displays a non-hierarchical view of visual representations of information items arranged in the groups (510). Non-hierarchical views can have a variety of display formats (e.g., icon view, list view, column view) with different behaviors as described in reference to FIGS. 1-3.

Figure 6:
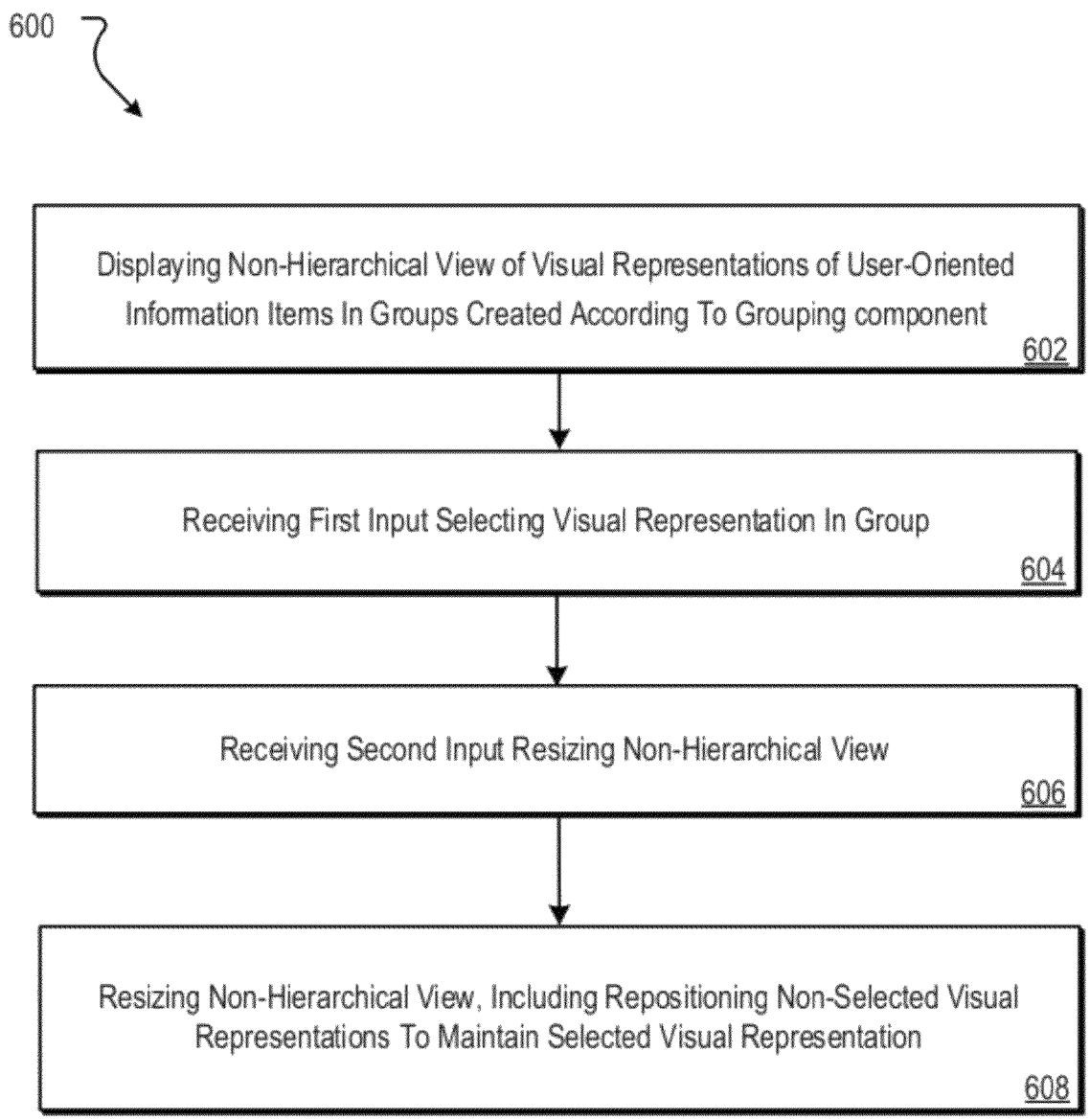
FIG. 6 is a flow diagram of an exemplary process for the repositioning of a group of visual representations in response to resizing of a non-hierarchical view.

FIG. 6 is a flow diagram of an exemplary process 600 for the repositioning a group of visual representations in response to resizing a non-hierarchical view. Process 600 can be implemented by software architecture 400 implemented on device architecture 800, as described in reference to FIGS. 4 and 8.

In some implementations, process 600 can begin by displaying a non-hierarchical view of visual representations of user-oriented information items arranged in groups created according to a grouping component (602). The grouping component can be specified by a user. Some examples of grouping components include but are not limited to: Kind, Size, Data, Apps and Label.

Process 600 receives first input selecting a visual representation in a group displayed in the non-hierarchical view (604). The first input can be touch input or input provided by an input device, such as a mouse or keyboard.

Process 600 receives second input for resizing the non-hierarchical view (606). The second input can be touch input or input provided by an input device, such as a keyboard or mouse. The resizing can make the non-hierarchical view expand or contract.

Process 600 resizes the non-hierarchical view, including repositioning non-selected visual representations in a row to maintain the selected visual representations in the non-hierarchical view (608). When a non-hierarchical view is contracting, reposition can include stacking visual representations that are no longer in view onto one of two overflow icons located at opposite ends of the row as the view is contracting. When the non-hierarchical view is expanding, reposition can include removing visual representations off the stack one by one and laying the visual representations in the group row as the view is expanding.

FIG. 7A is a flow diagram of an exemplary process 700 for navigating a group of visual representations in a non-hierarchical view. Process 700 can be implemented by software architecture 400 implemented on device architecture 800, as described in reference to FIGS. 4 and 8.

In some implementations, process 700 can begin by displaying a non-hierarchical view of visual representations of user-oriented information items in groups created according to a grouping component (702). Process 700 receives input initiating navigation of visual representations in a group in the non-hierarchical view (704). For example, a user can use a swipe gesture in a row to display additional visual representations for information items in the group. Process 700 navigates the visual representations in the group independent of other groups in the non-hierarchical view (706).

FIG. 7B is a flow diagram of an exemplary process 708 for navigating a group of visual representations in a non-hierarchical view. Process 708 can be implemented by software architecture 400 implemented on device architecture 800, as described in reference to FIGS. 4 and 8.

In some implementations, process 708 can begin by displaying a non-hierarchical view of visual representations of user-oriented information items in groups created according to a grouping component (710). Process 708 receives input initiating display of additional visual representations in the group (712). For example, a user can click or touch an overflow icon located on either end of the group row to initiate display of additional visual representations, as described in reference to FIG. 1A. In another example, the user can specify a condense view that results in additional visual representations being displayed in multiple rows in a fixed amount of screen space in the non-hierarchical view. Responsive to the input, process 708 displays additional visual representations in the group row independent of other groups in the non-hierarchical view (714).

Exemplary Device Architecture

Figure 8:
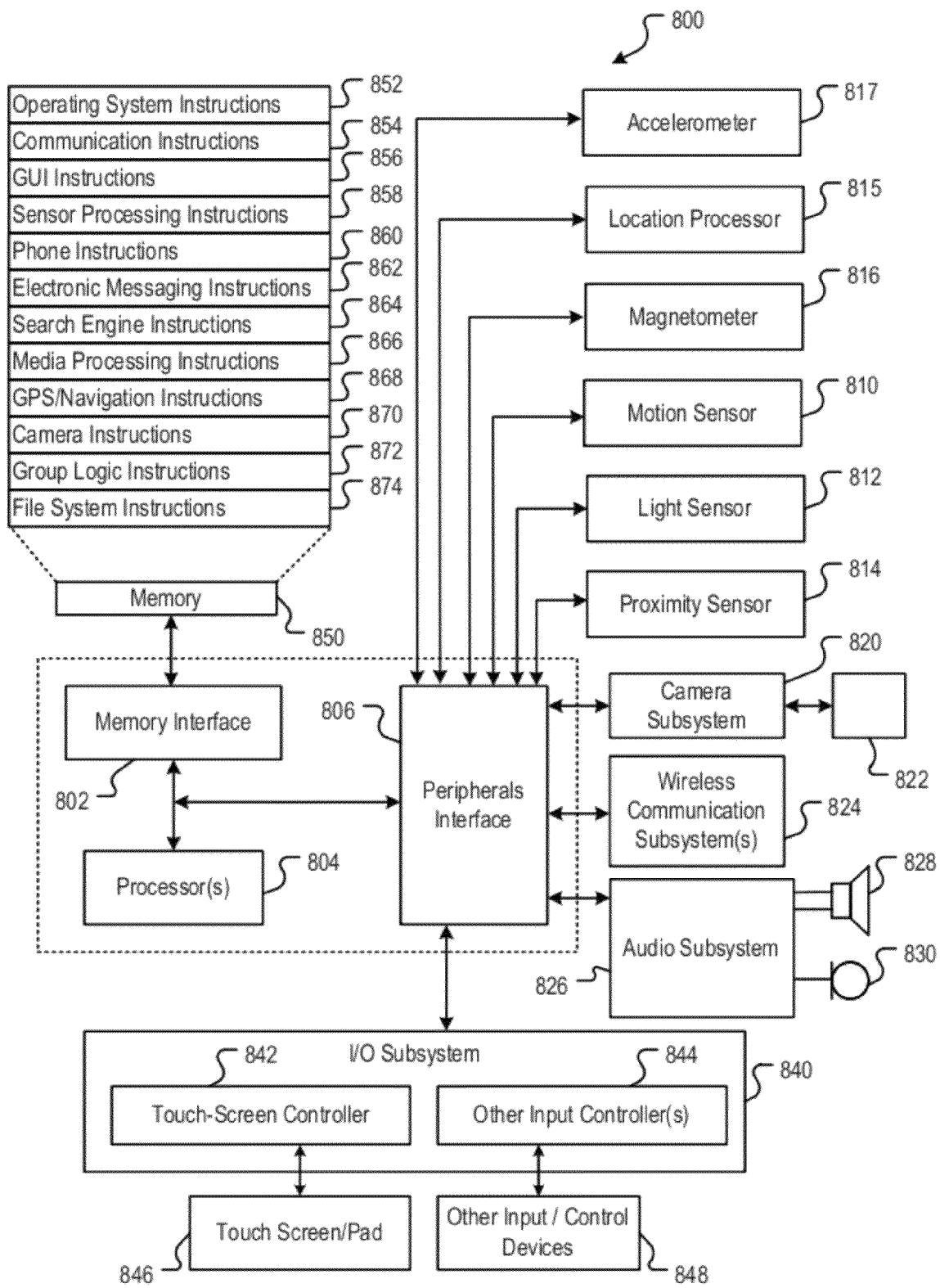
FIG. 8 is a block diagram of exemplary hardware architecture for implementing the features and processes described in reference to FIGS. 1-7.

FIG. 8 is a block diagram of exemplary device architecture 800 for implementing the features and processes described in reference to FIGS. 1-7. The device architecture 800 can include memory interface 802, one or more data processors, image processors and/or processors 804, and peripherals interface 806. Memory interface 802, one or more processors 804 and/or peripherals interface 806 can be separate components or can be integrated in one or more integrated circuits. The various components in the device, for example, can be coupled by one or more communication buses or signal lines. The device architecture 800 can be implemented in any device capable of displaying information items, including but not limited to desktop and mobile computers, smart phones, email devices, electronic tablets, digital media devices, television systems, set-top boxes, digital cameras, personal digital assistants (PDAs), etc.

Sensors, devices, and subsystems can be coupled to peripherals interface 806 to facilitate multiple functionalities. For example, motion sensor 810, light sensor 812, and proximity sensor 814 can be coupled to peripherals interface 806 to facilitate orientation, lighting, and proximity functions of the mobile device. Location processor 815 (e.g., GPS receiver) can be connected to peripherals interface 806 to provide geopositioning. Electronic magnetometer 816 (e.g., an integrated circuit chip) can also be connected to peripherals interface 806 to provide data that can be used to determine the direction of magnetic North. Thus, electronic magnetometer 816 can be used as an electronic compass. Accelerometer 817 can also be connected to peripherals interface 806 to provide data that can be used to determine change of speed and direction of movement of the mobile device.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which a device is intended to operate. For example, a mobile device can include communication subsystems 824 designed to operate over a GSM network, a GPRS network, an EDGE network, a WiFi or WiMax network, and a Bluetooth network. In particular, the wireless communication subsystems 824 can include hosting protocols such that the mobile device can be configured as a base station for other wireless devices.

Audio subsystem 826 can be coupled to a speaker 828 and a microphone 830 to facilitate voice-enabled functions, such as voice recognition, voice replication, digital recording, and telephony functions.

I/O subsystem 840 can include touch screen controller 842 and/or other input controller(s) 844. Touch controller 842 can be coupled to a touch screen/pad 846. Touch screen/pad 846 and touch controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen/pad 846.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830. The touch screen 846 can, for example, also be used to implement virtual or soft buttons and/or a keyboard.

In some implementations, device architecture can present recorded audio and/or video files, such as MP3, AAC, and MPEG files. In some implementations, the device architecture can include the functionality of an MP3 player, such as an iPod™. The device may, therefore, include a pin connector that is compatible with the iPod. Other input/output and control devices can be used.

Memory interface 802 can be coupled to memory 850. Memory 850 can include high-speed random access memory and/or non-volatile memory, such as one or more magnetic disk storage devices, one or more optical storage devices, and/or flash memory (e.g., NAND, NOR). Memory 850 can store operating system 852, such as Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers and/or one or more servers. Memory 850 may include graphical user interface instructions 856 to facilitate graphic user interface processing, such as the user interfaces illustrated in FIGS. 1A-1E; sensor processing instructions 858 to facilitate sensor-related processing and functions; phone instructions 860 to facilitate phone-related processes and functions; electronic messaging instructions 862 to facilitate electronic-messaging related processes and functions, such as SMS and MMS; search engine instructions 864 to facilitate search requests on local and virtual file systems on (or coupled to) the device; media processing instructions 866 to facilitate media processing-related processes and functions; GPS/Navigation instructions 868 to facilitate GPS and navigation-related processes and instructions; and camera instructions 870 to facilitate camera-related processes and functions. The memory 850 may also store other software instructions (not shown), such as security instructions, web video instructions to facilitate web video-related processes and functions, and/or web shopping instructions to facilitate web shopping-related processes and functions.

Memory 850 can include group logic instructions 872 for assigning information items to groups and updating the group assignments through search queries. Memory 850 can also include file system instructions 874 for implementing local and virtual file systems (e.g., for accessing files on a network) on the device.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the device architecture may be implemented in hardware and/or in software, including in one or more signal processing and/or application specific integrated circuits.

Figure 9:
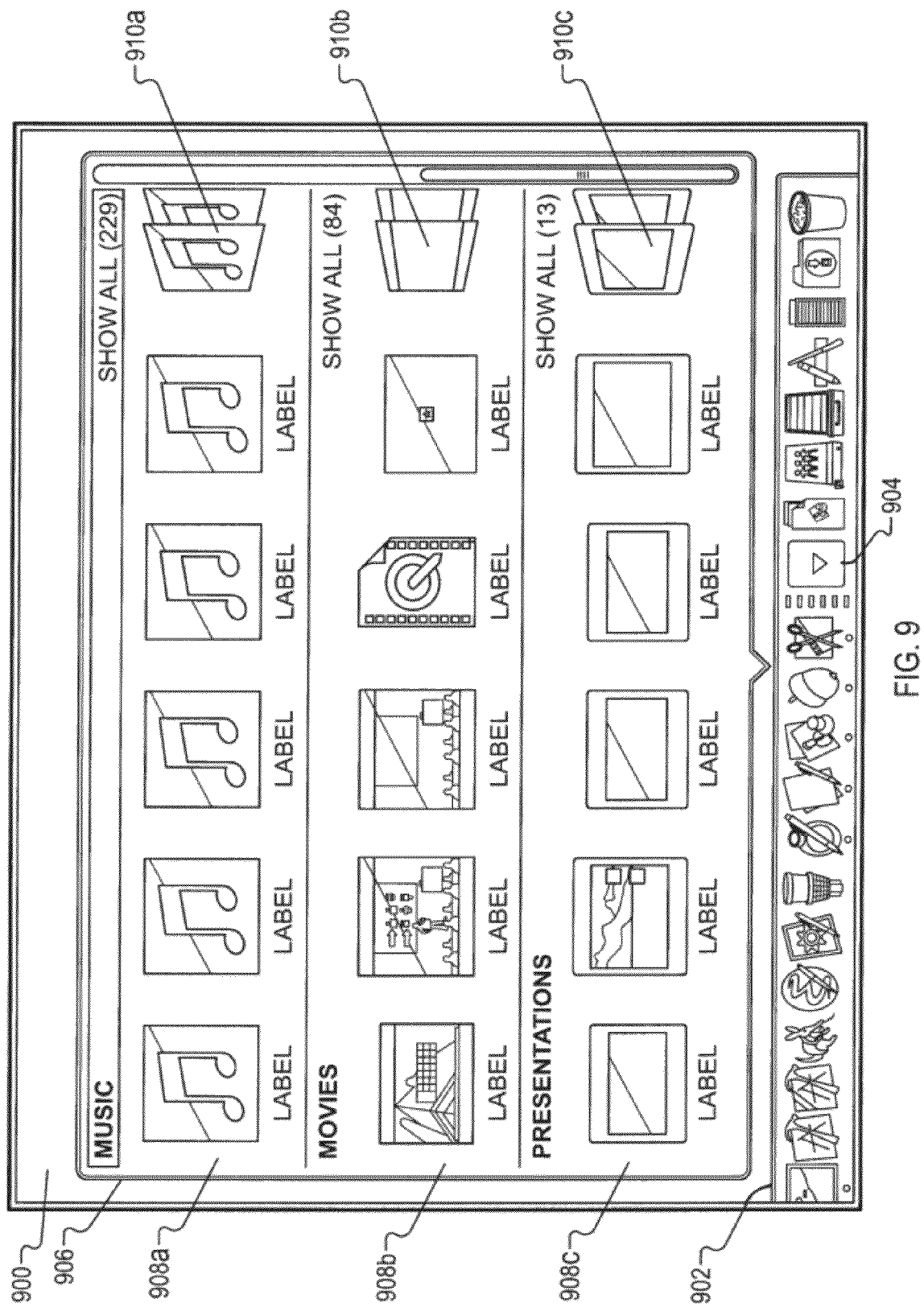
FIG. 9 illustrates an exemplary non-hierarchical, dock stack view of visual representations of user-oriented information items on a computer system display.

FIG. 9 illustrates an exemplary non-hierarchical, dock stack view of visual representations of user-oriented information items on a computer system display. In some implementations, a dock stack view of groups can be displayed. In the example shown, desktop 900 includes dock 904 for displaying visual representations of applications or other items. Included on dock 904 is mechanism 902 for displaying group view 906. Group view 906 includes groups 908a, 908b and 908c, including visual representations for music, movies and presentations, respectively. Each group includes overflow icons 910a, 910b and 910c, which can be selected separately to display additional icons. In the example shown, overflow icons 910a, 910b and 910c can be displayed in a perspective view with depth and slightly rotated out of the screen as shown in FIG. 9.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. Yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   causing a non-hierarchical view to be presented on a display of a device, the view including visual representations of corresponding information items, the visual representations arranged in the view in groups according to a grouping component;
   receiving an input specifying an action to be performed on the non-hierarchical view with the input to specify an icon view format for the groups in the view;
   performing the action based on the input including causing visual representations for the groups to be displayed with the icon view format in a different row for each group in the non-hierarchical view, where the method is performed by one or more computer processors;
   receiving a dragging input for resizing the non-hierarchical view; and
   responsive to the dragging input for resizing the non-hierarchical view, stacking visual representations that are no longer in the icon view as at least one row contracts onto an overflow icon at an end of the at least one row when the view contracts and laying out visual representations that are removed off a stack and are brought into the icon view one by one in the at least one row as the at least one row expands when the view expands.

2. The method of claim 1, where the information items are user-oriented information items.

3. The method of claim 1, further comprising:
   receiving input causing navigation of a group of visual representations independent of other groups of visual representations in the icon view.

4. The method of claim 3, where receiving input causing navigation of the group of visual representations further comprises:
   receiving input initiating horizontal scrolling of the visual representations in a row.

5. The method of claim 3, where receiving input causing navigation of a group of visual representations further comprises:
   receiving input selecting an overflow icon located on an end of the row; and
   responsive to the input, causing additional visual representations of information items in the group to be displayed in a row.

6. The method of claim 1, further comprising:
   receiving input specifying an arrange type for a row of visual representations; and
   automatically arranging the group of visual representations according to the specified arrange type.

7. The method of claim 1, further comprising:
   causing each group of visual representations in the view to be visually delineated from the other groups of visual representations in the non-hierarchical view.

8. The method of claim 1, further comprising:
   causing a header to be displayed with each group of visual representations.

9. The method of claim 1, further comprising:
   receiving input selecting a condense view for the visual representations; and causing the visual representations to be displayed in multiple rows in a fixed amount of screen space in the non-hierarchical view.

10. A system comprising:
    one or more processors;
    memory storing instructions, which, when executed by the one or more processors, causes the one or more processors to perform operations comprising:
    causing a non-hierarchical view to be presented on a display of a device, the view including visual representations of corresponding information items, the visual representations arranged in the view in groups according to a grouping component;
    receiving input specifying an action to be performed on the non-hierarchical view or on a group of visual representations in the view including receiving an input to specify an icon view format for the groups in the view;
    performing the action based on the input including causing visual representations for the groups to be displayed with the icon view format in a different row for each group in the non-hierarchical view;
    receiving a dragging input for resizing the non-hierarchical view; and
    responsive to the dragging input for resizing the non-hierarchical view, stacking visual representations that are no longer in the icon view as at least one row contracts onto an overflow icon at an end of the at least one row when the view contracts and laying out visual representations that are removed off a stack and are brought into the icon view one by one in the at least one row as the at least one row expands when the view expands.

11. The system of claim 10, where the information items are user-oriented information items.

12. The system of claim 10, further comprising:
    receiving input causing navigation of a group of visual representations independent of other groups of visual representations in the icon view.

13. The system of claim 12, where receiving input causing navigation of a group of visual representations further comprises:
    receiving input initiating horizontal scrolling of the visual representations in a row.

14. The system of claim 12, where receiving input causing navigation of a group of visual representations further comprises:
    receiving input selecting an overflow icon located on the end of the row; and
    responsive to the input, causing additional visual representations of information items in the group to be displayed in the row.

15. The system of claim 10, further comprising:
    receiving input specifying an arrange type for a row of visual representations; and
    automatically arranging the group of visual representations according to the specified arrange type.

16. The system of claim 10, further comprising:
    causing each group of visual representations in the view to be visually delineated from the other groups of visual representations in the non-hierarchical view.

17. The system of claim 10, further comprising:
    causing a header to be displayed with each group of visual representations.

18. The system of claim 10, further comprising:
    receiving input selecting a condense view for the visual representations; and causing the visual representations to be displayed in a fixed amount of screen space in the non-hierarchical view.

19. A non-transitory computer-readable medium containing executable computer program instructions which when executed by a computing system cause said system to perform a method, the method comprising:
   causing a non-hierarchical view to be presented on a display of a device, the view including visual representations of corresponding information items, the visual representations arranged in the view in groups according to a grouping component;
   receiving an input specifying an action to be performed on the non-hierarchical view with the input to specify an icon view format for the groups in the view;
   performing the action based on the input including causing visual representations for the groups to be displayed with the icon view format in a different row for each group in the non-hierarchical view;
   receiving a dragging input for resizing the non-hierarchical view; and
   responsive to the dragging input for resizing the non-hierarchical view, stacking visual representations that are no longer in the icon view as at least one row contracts onto an overflow icon at an end of the at least one row when the view contracts and laying out visual representations that are removed off a stack and are brought into the icon view one by one in the at least one row as the at least one row expands when the view expands.

20. The medium of claim 19, where the information items are user-oriented information items.

21. The medium of claim 19, further comprising:
   receiving input causing navigation of a group of visual representations independent of other groups of visual representations in the icon view.

22. The medium of claim 21, where receiving input causing navigation of the group of visual representations further comprises:
   receiving input initiating horizontal scrolling of the visual representations in a row.

23. The medium of claim 21, where receiving input causing navigation of a group of visual representations further comprises:
   receiving input selecting an overflow icon located on an end of the row; and
   responsive to the input, causing additional visual representations of information items in the group to be displayed in a row.

24. The medium of claim 19, further comprising:
   receiving input specifying an arrange type for a row of visual representations; and
   automatically arranging the group of visual representations according to the specified arrange type.

25. The medium of claim 19, further comprising:
   causing each group of visual representations in the view to be visually delineated from the other groups of visual representations in the non-hierarchical view.

26. The medium of claim 20, further comprising:
   causing a header to be displayed with each group of visual representations.

27. The medium of claim 21, further comprising:
   receiving input selecting a condense view for the visual representations; and
   causing the visual representations to be displayed in multiple rows in a fixed amount of screen space in the non-hierarchical view.

* * * * *